United States Patent [19]

Herty, III et al.

[11] 4,332,631
[45] Jun. 1, 1982

[54] CASTABLE SILICONE BASED MAGNESIUM FUELED PROPELLANT

[75] Inventors: Charles H. Herty, III; Samuel E. McClendon, both of Waco, Tex.

[73] Assignee: Hercules Incorporated, Wilmington, Del.

[21] Appl. No.: 164,730

[22] Filed: Jun. 19, 1980

[51] Int. Cl.³ ............................................. C06B 45/10
[52] U.S. Cl. ..................... 149/19.2; 60/207; 60/208; 149/20; 149/114
[58] Field of Search .................. 60/207, 208; 149/19.1, 149/19.2, 19.9, 20, 114

[56] References Cited

U.S. PATENT DOCUMENTS

| | | | |
|---|---|---|---|
| 3,068,641 | 12/1962 | Fox | 60/207 |
| 3,113,894 | 12/1963 | Burton | 149/19.2 |
| 3,137,599 | 6/1964 | Alsgaard et al. | 149/19.2 |
| 3,196,059 | 7/1965 | Godfrey | 149/19.2 |
| 3,411,964 | 11/1968 | Douda | 149/19.2 |
| 3,665,862 | 5/1972 | Lane | 149/19.2 |
| 3,682,727 | 8/1972 | Heinzelmann et al. | 149/19.2 |
| 3,715,246 | 2/1973 | Sayles | 149/19.2 |
| 3,761,330 | 9/1973 | Lou et al. | 149/19.2 |
| 3,986,909 | 10/1976 | Macri | 149/19.9 |
| 4,019,932 | 4/1977 | Schroeder | 149/19.2 |
| 4,060,435 | 11/1977 | Schroeder | 149/19.2 |
| 4,133,173 | 1/1979 | Schadow | 60/207 |
| 4,210,474 | 7/1980 | Frosch | 149/19.9 |

*Primary Examiner*—Edward A. Miller
*Attorney, Agent, or Firm*—Michael B. Keehan

[57] ABSTRACT

A castable solid propellant composition suitable for use as a fuel generator for a ducted rocket motor is provided. The binder for the composition is a crosslinked polysiloxane. The polysiloxane polymer which is crosslinked to form the binder has a viscosity measured at 77° F. of from about 12 poise to about 50 poise. The metal fuel for the composition is a mixture of spherical and flake magnesium. The composition contains from about 16% to about 20% polysiloxane binder and from 55% to 63% magnesium fuel. The oxidizer is principally ammonium perchlorate.

3 Claims, 2 Drawing Figures

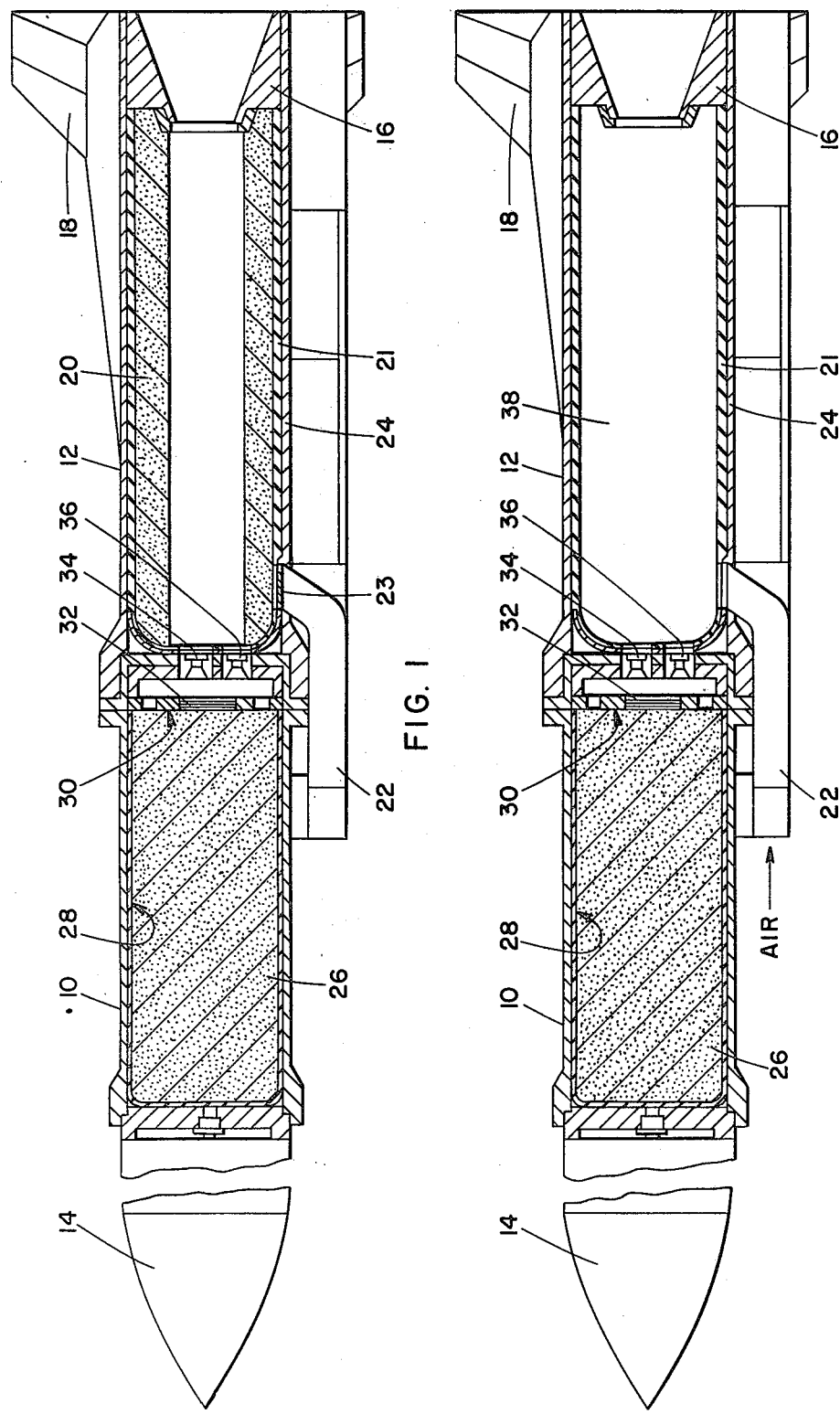

CASTABLE SILICONE BASED MAGNESIUM FUELED PROPELLANT

The Government has rights in this invention pursuant to contract No. F04611-76-C-0042 awarded by the Department of the Air Force.

This invention relates to a castable silicone based magnesium fueled propellant.

More particularly, this invention relates to a solid propellant fuel generator particularly suitable for use in a ducted rocket motor which solid propellant employs a polysiloxane binder and magnesium as fuel.

BACKGROUND

Air augmented rockets offer potential performance advantages over conventional rocket systems. The advantages inherent in air augmented rockets have long been recognized. The advantages result in using atmospheric air as an oxidizer, supplanting a significant fraction of the oxidizer that must be transported in a more conventional rocket. One member of the air augmented propulsion family of rocket motors is the ducted rocket comprising a solid propellant fuel generator, a booster propellant, a secondary combustion chamber including air inlets, and exhaust nozzle. The secondary combustion chamber typically houses an integral solid propellant booster grain and ejectable nozzle. The ducted rocket has potential of delivering an effective specific impulse in the sustain phase (air augmented combustion phase) 50–60% greater than that of a conventional solid propellant powered rocket. This greater effective specific impulse leads to greater mission capability, e.g., longer range, higher velocity, greater payload, etc.

The purpose of a solid propellant fuel generator for a ducted rocket is to deliver to the secondary combustion chamber a combustible-rich exhaust capable of high heat release when combined with the ram air stream provided by the ducted rocket system. Light metals such as boron, aluminum and magnesium are attractive from a thermochemical performance standpoint as a fuel for a solid propellant fuel generator for use in a ducted rocket at high percentage metal loadings, greater than 50% by weight based on the weight of the propellant. One difficulty with light metal loaded propellants for fuel generators for ducted rockets has been low burning rates.

Castable magnesium-rich propellants based on hydrocarbon binders are difficult to formulate with burning rates much in excess of 0.9 in./sec. at 600 psia because of char formation which takes place during burning. The char formed partially inhibits combustion of the magnesium and impedes the progress of the flame front during burning. Higher burning rates, i.e., greater than 0.9 in./sec. are possible with magnesium-rich propellants based on hydrocarbon binders when ferrocenes or carboranes are employed in the propellant compositions. However, these burning rate adjuvants are expensive and impart adverse aging and migration characteristics in propellants containing such materials.

SUMMARY OF THE INVENTION

In accordance with this invention, a castable, solid propellant suitable for use as a fuel generator for a ducted rocket motor is provided, said propellant comprising by weight from about 50–55% spherical magnesium, from about 5 to about 13% flaked magnesium, the combined weight of the spherical and flake magnesium being from about 55% to about 63% by weight of the propellant, from about 18% to about 25% of oxidizer of which at least about 80% is ammonium perchlorate, from about 16–20% of a polysiloxane binder, and the weight ratio of oxidizer to polysiloxane binder is from about 0.9/1 to about 1.5/1.

The magnesium employed in the castable propellant of this invention comprises a mixture of spherical magnesium and flake magnesium. The spherical magnesium is atomized magnesium having 98% minimum magnesium content and a nominal particle size of from about 44 microns to about 500 microns and preferably from about 44 microns to about 300 microns. The flake magnesium is Grade A, Type I, having 96% minimum magnesium content and 98% must pass through a 325 mesh screen based on U.S. Standard Sieves. The atomized magnesium employed is Type III (atomized) granulation Nos. 16 and 17. These magnesium materials are defined in JAN-M-382A dated June 23, 1949, and MIL-M-38213. The propellant compositions of this invention contain from about 55% to about 63% by weight of magnesium of which from about 50–55% is spherical magnesium and from about 5–15% by weight is flake magnesium. The propellant compositions of this invention contain at least about 5% by weight of flake magnesium. Below 5% flake magnesium, adverse effects can occur in combustion efficiency and burning rates of the propellant composition decrease. As the percentage of flake magnesium increases above about 15% by weight, the propellant becomes extremely difficult to cast and at 20% by weight the propellant is uncastable.

The solid oxidizer which can be employed in the castable propellant of this invention is preferably ammonium perchlorate having a particle size of from about 1 micron to about 200 microns. At least 80% by weight of the solid oxidizer must be ammonium perchlorate. Other oxidizers which can be employed with ammonium perchlorate in amounts of up to about 20% of the total solid oxidizer include potassium perchlorate, cyclotrimethylene trinitramine (RDX) and cyclotetramethylene tetranitramine (HMX).

The polymeric binder which can be employed in the castable propellant of this invention is a polysiloxane polymer which is crosslinked at room temperature, i.e., about 22° C. The polysiloxane binder has a polymeric backbone of alternating silicon and oxygen atoms with pendent hydrocarbon groups on the silicon atoms. The pendent hydrocarbon groups are predominantly methyl groups but some phenyl groups, up to about 10% by weight, are often included in the polymer. The polysiloxane polymers which can be employed are low molecular weight polymers having a viscosity measured at 77° F. of from about 12 poises to about 50 poises. As viscosity of the polymer increases above about 50 poises, the castability of the propellant being prepared is adversely effected and casing becomes very difficult. Castability can be improved by the addition of low viscosity (about 50 cps) silicone diluents or plasticizers. The polysiloxane binder employed in the propellant of this invention decomposes without forming an inhibiting char layer around the magnesium particles within the propellant. The weight ratio of oxidizer/binder in the propellant of this invention is from about 0.9 to about 1.5. If the oxidizer/binder ratio exceeds about 1.5, then the percentage of magnesium fuel being oxidized to magnesium oxide and delivered to the ram burner decreases resulting in reduction in energy provided by the rocket motor. If the oxidizer/binder ratio falls below 0.9, then flame temperature is lowered which results in decreased efficiency in expelling fuel from the generator into the secondary combustion chamber and excessive slagging of the nozzles can occur due to the presence of liquid magnesium.

Polysiloxane binders of the type employed in the fuel generator propellant of this invention are available commercially. Commercial polysiloxane binders that can be employed include, without limitation, General Electric's RTV silicone 602, 615, and 910 and Dow Corning's Sylgard resins 182 and 184. The polysiloxanes are crosslinked to form the polysiloxane binder. Illustrative crosslinking agents include dibutyl tin dilaurate, ethyl silicate and alkyltrialkoxysilane. Plasticizers or silicone diluents can be employed in the binders to reduce viscosity. Typical plasticizers are polydimethyl siloxanes having a viscosity of about 50 centipoises.

A typical ducted rocket motor in which the solid fuel generator propellant of this invention can be employed is illustrated in the drawings in which:

FIG. 1 is a longitudinal view of a ducted rocket motor partly in cross-section and FIG. 2 is a longitudinal view, partly in cross-section further illustrating a ducted rocket motor containing a solid fuel generator propellant.

As shown in FIG. 1, the ducted rocket motor consists of a forward cylindrical section 10, an aft cylindrical section 12, a nose 14, nozzle 16 and airfoil 18. A booster propellant 20 is housed in aft section 12. An air inlet duct 22 is mounted parallel to the longitudinal axis of the rocket motor adjacent the forward end of the aft section 12 of the rocket motor and mounted contiguous with the exterior surface of the assembled rocket motor. The air inlet duct 22 extends forward of the aftend of the forward section 10. The air inlet passes through an opening in the side wall 24 of the aft section 12 and is attached (not shown) to the side wall 24 forming aft section 12. Booster propellant 20 is cast over the ram burner insulation 21 and port cover 23. Port cover 23 seals the opening in side wall 24 into which air duct 22 connects.

The fuel generator propellant 26 of this invention is stored within chamber 28 of forward section 10. At the base 30 of the fuel generator propellant 26 is an igniter 32. Spaced from base 30 of fuel generator propellant 26 are two nozzles 34, 36. In operation, booster propellant 20 is ignited and burns to provide the initial thrust for the ducted rocket. Upon burn out, the chamber which held the booster propellant 20 becomes the secondary combustion chamber for the fuel generator propellant. Igniter 32, on command, ignites fuel generator propellant 26 and the exhaust gases containing a high percentage of magnesium particles pass through nozzles 34, 36 into secondary combustion chamber 38 (see FIG. 2). Air passes through the air inlet duct 22 and being under a high pressure resulting from the high velocity of the rocket, the air rushes into secondary chamber 38 and mixes with the hot magnesium particles and other combustion gases resulting from burning of the fuel generator propellant. Additional combustion takes place in the secondary combustion chamber 38 and the exhaust gases pass through nozzle 16 providing additional thrust for the rocket motor.

The examples which follow illustrate a process for preparation of the castable fuel generator propellant of this invention and its ballistic properties. In the examples and throughout this specification, percentages are by weight unless otherwise specified.

EXAMPLE 1

A mixer is charged with polysiloxane polymer having a viscosity of 40 poises at 77° F., polydimethyl siloxane plasticizer, iron oxide (combustion catalyst) and about 50% of the total magnesium metal which is to be employed as a fuel in the final propellant composition. Hexane is added to the mixer in a sufficient amount so that a slurry is produced without intensive mixing action. The resulting slurry is mixed for about 5 minutes and all additional magnesium is added to the slurry and mixing is continued for an additional 5 minutes. Ammonium perchlorate is then added to the resulting slurry in two equal increments with mixing continuing for about 5 minutes after addition of each increment. The resulting propellant mixture is then mixed under vacuum at 170° F. until the temperature of the mixture stabilizes at about 170° F. Mixing is continued under vacuum until the vacuum on the propellant mixture is at least 28 inches of mercury (minimum). After the temperature of the propellant mixture has stabilized and the vacuum of the mixture is at least 28 inches of mercury, the temperature of the propellant mass is reduced to about 100° F. The cooled propellant mass is then mixed for an additional 60 minutes under vacuum. A curing agent for the polysiloxane is then added to the propellant mass with mixing continuing for an additional 20 minutes under a vacuum of about 28 inches mercury. The resulting propellant is then cast into molds of desired sizes and shapes.

EXAMPLES 2-4

Following the mixing procedure of Example 1, castable solid propellants for a fuel generator are prepared. The compositions and properties of the propellants are given in Table 1 below.

In the composition listed in Table I the spherical magnesium employed is Type III, granulation No. 17 (nominal mesh size of 50 to 100 based on U.S. Standard Sieves). The flake magnesium is Type I of which 98% passes through a 325 mesh screen (based on U.S. Standard Sieves). The ammonium perchlorate employed in the composition of Examples 2 and 3 has a particle size of about 10 microns. The ammonium perchlorate employed in the composition of Example 4 is a bimodal mixture, about $66\frac{2}{3}\%$ having a particle size of 10 microns and $33\frac{1}{3}\%$ having a particle size of 200 microns.

TABLE 1

|  | Ex. 2 | Ex. 3 | Ex. 4 |
| --- | --- | --- | --- |
| Composition, wt % |  |  |  |
| Magnesium, Spherical | 50 | 50 | 55 |
| Magnesium, Flake | 13 | 10 | 5 |
| Ammonium Perchlorate | 20 | 21 | 20 |
| Polysiloxane Binder | 17 | 19 | 20 |
| Polysiloxane, 30 poise[a] | 9.3 | 10.4 | 14.4 |
| Polysiloxane, 50 centipoise[b] | 6.8 | 7.6 | 4.0 |
| Alkyltrialkoxysilane[c] | 0.9 | 1.0 | 1.6 |
| Ballistic Properties |  |  |  |
| Theoretical Heating Value, BTU/lb. | 9055 | 9002 | 9116 |
| Burn Rate at 400 psi, in./sec. (measured) | 0.99 | 0.78 | 0.32 |
| Burn Rate at 600 psi, in./sec. (call) | 1.16 | 0.86 | 0.33 |
| Pressure Exponent (n) | 0.42 | 0.30 | 0.1 |
| $\sigma p$ (−65 to 165° F.), %/°F. | 0.065 | 0.11 | 0.18 |
| $\pi k$ (−65 to 165° F.), %/°F. | 0.108 | 0.16 | 0.19 |
| Theoretical Density, lb./cu.in. | 0.057 | 0.056 | 0.056 |
| 65 lb. Mix Viscosity, 1 hr. kp | 15.8 | 10.1 | 9.3 |
| Potlife, hr. | >8 | >8 | >8 |

TABLE 1-continued

|  | Ex. 2 | Ex. 3 | Ex. 4 |
|---|---|---|---|
| Tensile Properties at 77° F. | | | |
| $\epsilon m$, % (elongation) | 12 | 14 | 7 |
| $\sigma m$, psi (tensile strength) | 80 | 78 | 45 |
| E, psi (modulus) | 951 | 816 | 1108 |
| Secondary Combustion | | | |
| Expulsion Efficiency, %[d] | 99+ | 99+ | 93–96 |
| Combustion Efficiency, %[e] | 96–100 | 57–99 | 77–99 |
| Hazard Sensitivity | | | |
| Autoignition (5 sec.), °F. | — | — | — |
| Autoignition (5 sec.), °F. | >650 | >650 | >650 |
| Impact Sensitivity, in.-lb. | 43.7 | 46.0 | 57.5 |
| Spark Sensitivity, joules | — | — | — |

[a]RTV-615 available from General Electric Company, (polymer)
[b]RTV-910 available from General Electric Company, (plasticizer)
[c]RTV-615B available from General Electric Company, (crosslinker)
[d]Weight % of original propellant ejected from gas generator
[e]Percentage of measured ballistic performance compared with theoretical ballistic performance The burning rates of the castable propellant of this invention at a given burning pressure can be increased by increasing the flake magnesium content of the propellant, and/or by adding a combustion catalyst, such as iron oxide.

What I claim and desire to protect by Letters Patent is:

1. A castable solid propellant composition suitable for use as a fuel generator for a ducted rocket motor, said composition comprising by weight
   (a) from about 50% to about 55% of spherical magnesium having a particle size range from about 44 microns to about 500 microns, and from about 5% to about 13% of flake magnesium having a particle size range such that 100% passes through 40 mesh and about 98% passes through 325 mesh U.S. Standard Sieve Series, the combined percentages of spherical magnesium and flake magnesium being from 55% to about 63% by weight of the propellant composition, and
   (b) from about 18% to about 25% of solid oxidizer of which at least about 80% is ammonium perchlorate, and
   (c) from about 16% to about 20% of a polysiloxane binder comprising a polysiloxane polymer having a viscosity measured at 77° F. of from about 12 poise to about 50 poise, and a cross-linking agent for said polysiloxane polymer,
the weight ratio of solid oxidizer to polysiloxane polymer being from about 0.9/1 to about 1.5/1.

2. The castable solid propellant composition of claim 1 in which the spherical magnesium has a particle size of from about 44 microns to about 300 microns.

3. The castable solid propellant composition of claim 2 in which the solid oxidizer is 100% ammonium perchlorate.

* * * * *